Figure 1:
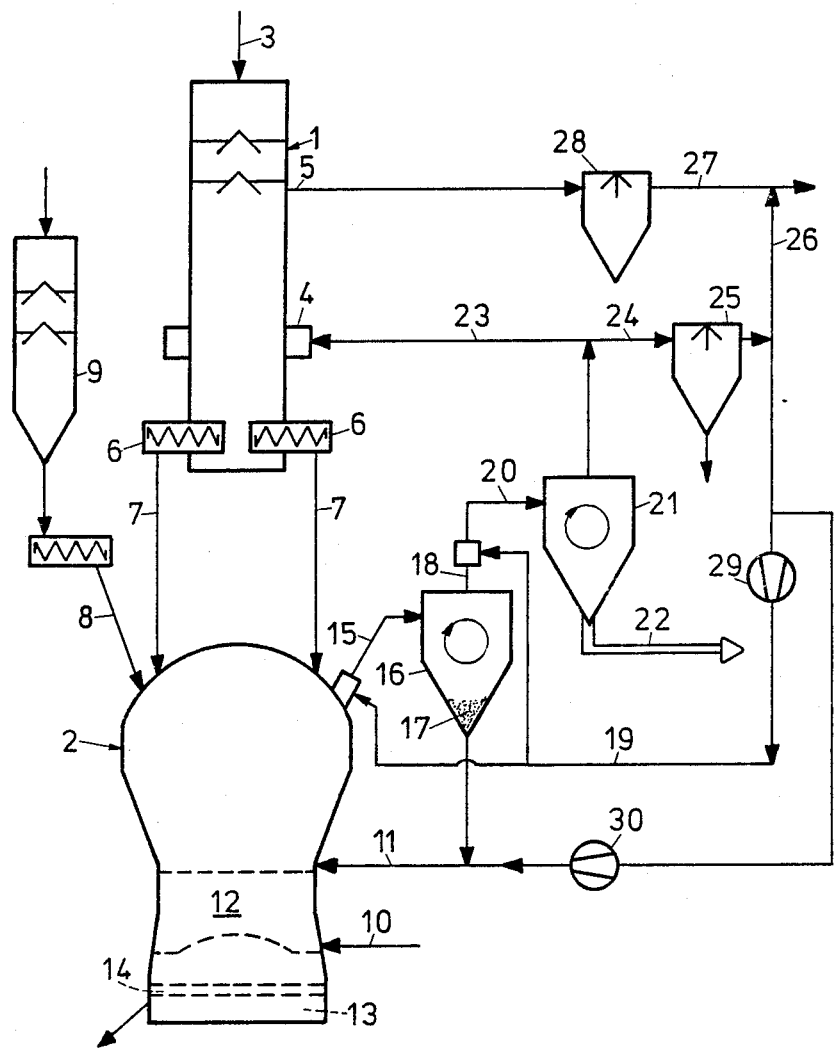

United States Patent [19]

Kepplinger

[11] Patent Number: 4,878,943
[45] Date of Patent: Nov. 7, 1989

[54] PROCESS OF DEZINCIFYING A MATERIAL FLOW WHEN OPERATING A PIG-IRON PRODUCTION PLANT

[75] Inventor: Werner Kepplinger, Linz, Austria

[73] Assignee: Deutsche Voest-Alpine Industrieanlagenbau GmbH, Dusseldorf, Fed. Rep. of Germany

[21] Appl. No.: 267,977

[22] Filed: Nov. 7, 1988

[30] Foreign Application Priority Data

Nov. 12, 1987 [AT] Austria ............................ 2994/87

[51] Int. Cl.$^4$ ............................................ C21B 13/14
[52] U.S. Cl. ............................................ 75/25; 75/38; 75/88; 266/157
[58] Field of Search ................ 75/25, 38, 88; 266/157

[56] References Cited

U.S. PATENT DOCUMENTS 4,283,223 8/1981 Billard ........................... 75/25
4,784,689 11/1988 Vuletic .......................... 266/160

Primary Examiner—Melvyn J. Andrews
Attorney, Agent, or Firm—Ostrolenk, Faber, Gerb & Soffen

[57] ABSTRACT

There is disclosed a process of dezincifying the flow of material at the operation of a plant for the production of pig iron including a direct reduction shaft furnace and a meltdown gasifier.

The crude reducing gas drawn off the meltdown gasifier is dedusted in two steps. In the first step zinc-poor coal dust is separated in a cyclone operated at a higher temperature, which is recycled into the meltdown gasifier. In the second step, upon cooling of the gas leaving the first cyclone, solid particles enriched with zinc are separated at a lower temperature. The dezincified reducing gas is fed to the direct reduction shaft furnace and the zinc-rich substances separated off the second cyclones are processed to a zinc concentrate.

1 Claim, 2 Drawing Sheets

PROCESS OF DEZINCIFYING A MATERIAL FLOW WHEN OPERATING A PIG-IRON PRODUCTION PLANT

The invention relates to a process of dezincifying the flow of material at the operation of a plant for the production of pig iron, wherein iron-oxide containing particulate charging substances are reduced in a direct reduction shaft furnace by means of a reducing gas, the sponge iron particles obtained are melted in a meltdown gasifier under addition of coal and oxygen-containing gas with the simultaneous formation of the reducing gas, the reducing gas is cooled and dedusted, supplied to the reduction zone of the shaft furnace, the separated dust is recycled into the melting zone of the meltdown gasifier, and the excess reducing gas is supplied to external consumers upon washing and cooling.

Plants and operational procedures of this kind are known. They are based on the principle that the iron-oxide containing material pre-reduced in a shaft furnace, i.e., sponge iron particles having a degree of metallization of up to about 95%, is introduced into a meltdown gasifier to which coal and oxygen are fed, a fluidized layer of a high temperature, thus, forming. The sponge iron particles are melted there, collecting in the bottom part of the meltdown gasifier. The reducing gas is produced by gasifying the charging substances and is fed to the direct reduction shaft furnace. Excess reducing gas from the meltdown gasifier and top gas from the direct reduction shaft furnace may be left to external consumers.

The process is particularly suited for locations destined for the production of pig iron, that have available little or no coking coal. The process is flexible as to the choice of raw material and is of economic importance.

A difficulty at the operation of such plants consists in that, due to the circulation of dusts and gases, the flow of material gradually gets enriched with foreign metals, among which zinc has proved disadvantageous. Normally, the crude reducing gas drawn off the meltdown gasifier at about 1,000° C. is cooled to 800° C. and is dedusted in a cyclone before it is introduced into the direct reduction shaft furnace and before the separated dust is recycled into the meltdown gasifier. During this pre-treatment, the major portion (about 80%) of the zinc vapors deposits on the coal dust particles; the zinc gets back into the meltdown gasifier by dust recycling, moving in circles.

Another portion of the zinc, about 20%, is carried away by the reducing gas; the part of the reducing gas required for reduction reaches the direct reduction shaft furnace (together with the zinc carried away); excess reducing gas, if any, is dedusted a second time in an injection cooler and is conveyed off as a pure gas. The remaining dust is discarded together with the waste sludge. With this mode of operation, the zinc gets more and more enriched during circulation, finally amounting to as much as 20 kg/t in the material flow present between the meltdown gasifier and the dedusting cyclone.

The invention aims at avoiding the difficulties described and has as its object to provide a simple and effective process by which the major portion of the zinc can be removed from the flow of material, the zinc is recovered in a concentrated form and may be made available to other prospects as a zinc source.

With a process of the initially defined kind, the invention is characterized in that the dedusting of the reducing gas is carried out in two steps in a manner that in the first step it is operated without cooling or with little cooling at the exit temperature of the reducing gas from the meltdown gasifier—at approximately 1,000° C.—with a zinc-poor dust essentially consisting of coal particles being incurred, which is recycled into the meltdown gasifier, and in the second step it is operated at approximately 800° C. upon cooling of the gas partially dedusted in the first step, with a dust enriched with deposited metallic zinc being obtained, which is collected as a zinc concentrate for further utilization.

Preferably, dedusting takes place in consecutively arranged cyclones, with cooling gas being supplied to the gas drawn off the first cyclone therebetween.

Figure 2:
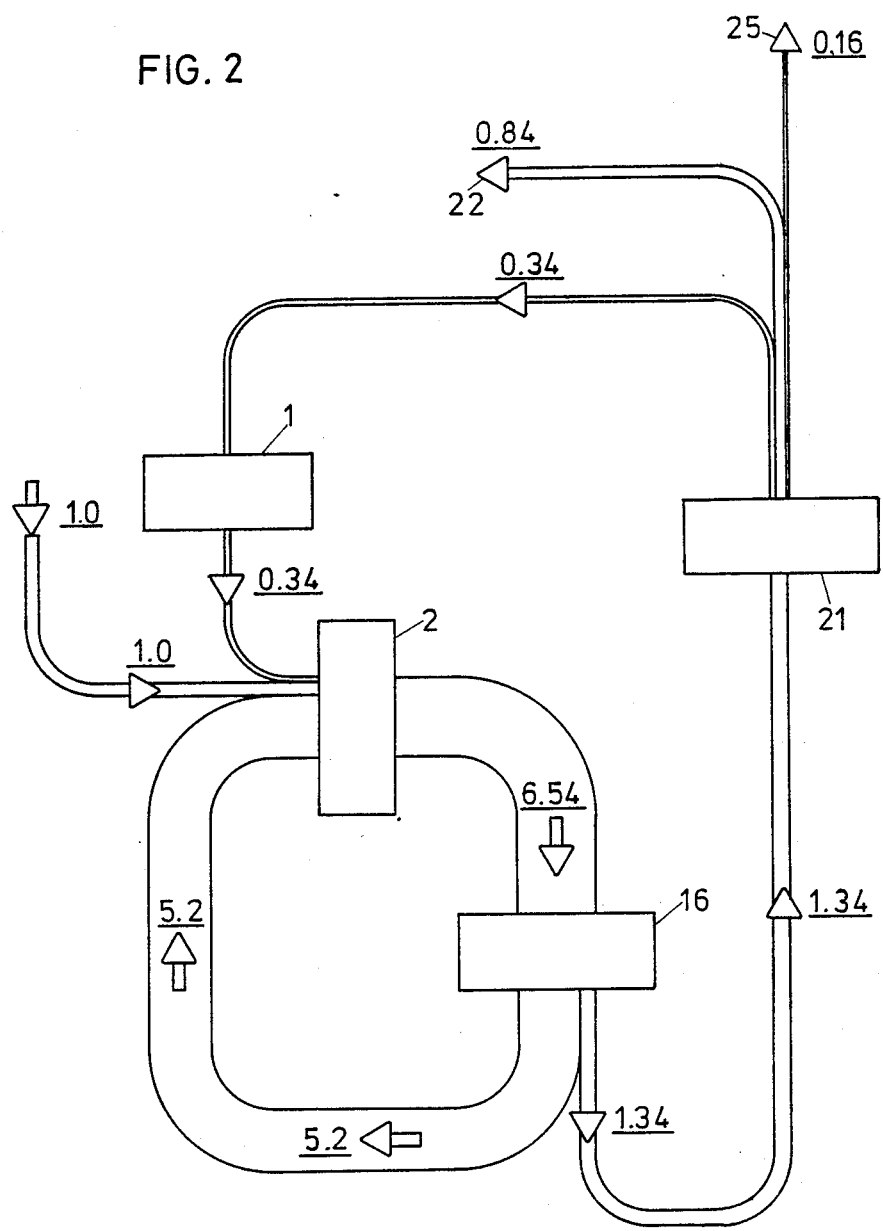

The process according to the invention will now be explained in more detail with reference to the accompanying drawings, wherein:

FIG. 1 illustrates the process scheme of a plant according to the invention; and FIG. 2 is a mass flow diagram during operation of this plant.

A direct reduction shaft furnace is denoted by 1 and a meltdown gasifier is denoted by 2, both of which may be combined to a structural unit. The direct reduction shaft furnace 1 has an entrance 3 for fine-particle ore. Furthermore, the direct reduction shaft furnace has an entrance 4 for reducing gas in its lower part and a discharge duct 5 for the top gas remaining after the reaction in its upper part.

The meltdown gasifier 2 is charged with pre-reduced material, i.e., with sponge iron, via the delivery opening 6 of the direct reduction shaft furnace 1 and an entrance 7. Moreover, a coal supply duct 8 enters into the meltdown gasifier 2, which is connected to the coal bunker 9. In addition, the meltdown gasifier 2 comprises a feed line 10 for oxygen and an entrance 11 for dusty charging material to be recycled.

In the central part of the meltdown gasifier 2, a fluidized bed 12 of a high temperature is formed by the partial gasification of the charging substances, the pre-reduced sponge iron material being melted there. Molten pig iron melt collects in the sump 13 on the bottom of the meltdown gasifier 2 and is covered by a slag layer 14. The crude reducing gas developed from supplied coal and oxygen is adjusted to a temperature of about 1,000° C. and is fed to a hot cyclone 16 through a duct 15. There, a dusty product is separated in the first step of the dedusting procedure according to the invention, which, to the major extent, consists of coal particles 17. The degree of dedusting in this step is about 80%.

The remaining gas is removed from the hot cyclone 16 via a duct 18 and is cooled to about 800° C. by supplying cooling gas from duct 19 before being introduced into the second cyclone 21 through duct 20. In this second dedusting step in the cyclone 21, further dedusting takes place at a dedusting degree of about 65%, with a solid product being incurred, that has a high concentration of zinc.

While zinc passes the first cyclone 16 together with the reducing gas in the form of zinc vapor, the zinc vapor deposits on the solid particles in a metallic manner in the second cyclone 21. The solid particles having a high zinc content are drawn off the bottom of cyclone 21 and are collected as a concentrate 22. This concentrate is available as a zinc source for further processing in the same plant or in external plants.

The gaseous reducing gas leaving the cyclone and largely purified is fed to the entrance 4 of the direct reduction shaft furnace 1 through duct 23 in the amount that is required for the reduction of the iron-oxide containing charging material. Excess reducing gas is cooled in an injection cooler 25 via a branch duct 24 and is purified from further solids still contained therein. The pure gas, which constitutes an excess gas, is discharged through a duct 26 and is united with the top gas coming from a duct 27 and having been purified in a preliminarily arranged scrubber 28. It is delivered to external users.

The plant, furthermore, comprises a cooling gas fan 29, which releases gas into the cooling gas duct 19, and a propellant gas fan 30 to convey the dust into the dust entrance 11 of the meltdown gasifier 2.

In FIG. 2, the mass flow diagram according to the process of the invention is illustrated, in which underlined numbers have been entered, meaning kg zinc per ton pig iron. An input amount of 1 kg zinc/t pig iron has been assumed. In the cycle between the meltdown gasifier 2, in which an amount of crude reducing gas of 2,000 m$^3$/t pig iron is produced, and the hot gas cyclone 16, a zinc amount of 5.2 kg/t pig iron is circulated. Hence add further 0.34 kg zinc/t pig iron coming from the cycle between the hot cyclone 16 and the second cyclone 21 and the direct reduction shaft furnace 1. The gas drawn off the hot cyclone 16 contains 1.34 kg zinc/t; the concentrate drawn off the second cyclone 21 contains 0.84 kg zinc/t. This means that more than 80% has been dezincified from the input amount and that no more than 0.16 kg zinc/t were contained in the sludge incurred from the injection cooler 25.

If, in contrast, you worked just with one cyclone at 800° C., as is characteristic of the prior art, a zinc amount of 12.5 kg/t pig iron would be circulated between the cyclone and the meltdown gasifier with the same input amount of 1 kg zinc/t pig iron. This would result not only in a higher zinc content of the output sludge, but even in an adverse effect on the quality of the pig iron produced, due to the zinc impurities contained therein.

What I claim is:

1. In a process for producing pig iron in a pig iron production plant including a direct reduction shaft furnace defining a reduction zone and a meltdown gasifier defining a meltdown zone, said process comprising:

reducing iron-oxide containing particulate charging substances in said direct reduction shaft furnace by a reducing gas so as to obtain sponge iron particles, melting said sponge iron particles in said meltdown gasifier by supplying coal and oxygen-containing gas thereby forming said reducing gas, cooling and dedusting said reducing gas so as to obtain dedusted reducing gas and separated dust.

supplying said dedusted reducing gas to said reduction zone of said direct reduction shaft furnace and recycling said separated dust to said meltdown zone of said meltdown gasifier, and washing and cooling excess reducing gas so as to make said excess reducing gas available to external consumers, the improvement wherein zinc is removed from said reducing gas is carried out in two steps in a consecutively arranged first cyclone and second cyclone by adjusting the temperature of said reducing gas exiting said meltdown gasifier to about 1,000° C. in said first cyclone so as to partially dedust said reducing gas and produce a first zinc-poor dust comprising coal particles, and recycling said dust to said meltdown gasifier; and cooling said partially dedusted reducing gas obtained from said first cyclone to about 800° C. by feeding cooling gas into said partially dedusted gas and further dedusting said reducing gas in said second cyclone so as to produce a purified gas and a second dust enriched with deposited metallic zinc, and collecting said metallic zinc as a zinc concentrate for further utilization, wherein said cooling gas comprises a portion being cooled before introduction into the second cyclone.

* * * * *